United States Patent
Weiss et al.

(10) Patent No.: US 12,005,888 B2
(45) Date of Patent: *Jun. 11, 2024

(54) METHOD AND APPARATUS FOR CONTROLLING A SAFETY DEVICE OF A VEHICLE, AND SAFETY SYSTEM FOR A VEHICLE

(71) Applicant: Robert Bosch GmbH, Stuttgart (DE)

(72) Inventors: Christian Weiss, Leonberg (DE); Gyorgy Csaba, Budapest (HU); Heiko Kirn, Bietigheim-Bissingen (DE); Nina Braunert, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

This patent is subject to a terminal disclaimer.

(21) Appl. No.: 17/453,417

(22) Filed: Nov. 3, 2021

(65) Prior Publication Data

US 2022/0144253 A1 May 12, 2022

(30) Foreign Application Priority Data

Nov. 9, 2020 (DE) ...................... 10 2020 214 033.2

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 50/0097; B60W 2554/4041; B60W 2554/4043
(Continued)

(56) References Cited

U.S. PATENT DOCUMENTS 4,491,840 A * 1/1985 Nishikawa ............. B60Q 9/008
367/909
6,031,484 A * 2/2000 Bullinger .............. G01S 13/931
342/72
(Continued)

FOREIGN PATENT DOCUMENTS

| DE | 102011115875 A1 | 4/2013 |
| DE | 102012021004 A1 | 4/2014 |
| DE | 102016201522 A1 | 8/2017 |

OTHER PUBLICATIONS

Choi et al., On-Road Object Collision Point Estimation by Radar Sensor Data Fusion, Sep. 2022 IEEE, vol. 23 No.9, pp. 14753-14763.*

*Primary Examiner* — Manglesh M Patel
(74) *Attorney, Agent, or Firm* — NORTON ROSE FULBRIGHT US LLP; Gerard A. Messina

(57) ABSTRACT

A method for controlling a safety device of a vehicle. The safety device reacts to an imminent collision of the vehicle with a collision object by an intervention in a longitudinal and/or lateral guidance of the vehicle. Environment data and trip data regarding the collision object and the vehicle, and intervention data regarding a planned intervention of the safety device, are read in. A first expected impingement point of the collision object on the vehicle is ascertained using the environment data and the trip data, and a second expected impingement point is ascertained using the environment data, the trip data, and the intervention data. A location of the first expected impingement point and of a location of the second expected impingement point relative to subregions referred to the vehicle are evaluated, using reference data. A control signal for the safety device is generated depending on a result of the evaluation.

9 Claims, 5 Drawing Sheets

(51) Int. Cl.
  *B60W 10/20* (2006.01)
  *B60W 30/095* (2012.01)
  *B60W 50/00* (2006.01)

(52) U.S. Cl.
  CPC .... *B60W 30/0956* (2013.01); *B60W 50/0097* (2013.01); *B60W 2554/4041* (2020.02); *B60W 2554/4043* (2020.02)

(58) Field of Classification Search
  USPC .......................................................... 701/301
  See application file for complete search history.

(56) References Cited

U.S. PATENT DOCUMENTS

| | | | | |
|---|---|---|---|---|
| 6,087,928 | A * | 7/2000 | Kleinberg | B60R 21/013 340/904 |
| 6,256,564 | B1 * | 7/2001 | Miyaguchi | B60R 21/0133 701/45 |
| 6,269,307 | B1 * | 7/2001 | Shinmura | G01S 13/931 340/436 |
| 7,986,261 | B2 * | 7/2011 | Harada | B60R 21/0134 342/107 |
| 9,199,643 | B1 * | 12/2015 | Zeng | G01S 13/726 |
| 9,517,767 | B1 * | 12/2016 | Kentley | B60W 10/30 |
| 9,555,781 | B2 * | 1/2017 | Breuer | B60W 50/16 |
| 10,543,838 | B2 * | 1/2020 | Kentley-Klay | G06F 3/04842 |
| 10,745,003 | B2 * | 8/2020 | Kentley-Klay | B60W 30/0953 |
| 2003/0149530 | A1 * | 8/2003 | Stopczynski | G08G 1/165 340/436 |
| 2005/0104721 | A1 * | 5/2005 | Mae | B60R 21/0136 340/436 |
| 2009/0259402 | A1 * | 10/2009 | Gates | G08G 3/02 701/301 |
| 2015/0266473 | A1 * | 9/2015 | Hayasaka | B60W 30/09 701/70 |
| 2016/0328974 | A1 * | 11/2016 | Yoshizawa | B60W 30/095 |
| 2017/0263127 | A1 * | 9/2017 | Auden | G08G 1/165 |
| 2017/0294124 | A1 * | 10/2017 | Baba | G01S 15/06 |
| 2017/0300780 | A1 * | 10/2017 | Baba | G06F 18/22 |
| 2018/0261094 | A1 * | 9/2018 | Nishimura | G08G 1/16 |
| 2019/0092324 | A1 * | 3/2019 | Kim | B60W 30/0956 |
| 2019/0243371 | A1 * | 8/2019 | Nister | G05D 1/0223 |
| 2020/0050536 | A1 * | 2/2020 | Nygaard | G06F 11/3684 |
| 2020/0130683 | A1 * | 4/2020 | Oguri | B60R 21/00 |
| 2020/0189573 | A1 * | 6/2020 | King | G06V 20/58 |
| 2020/0211394 | A1 * | 7/2020 | King | G06V 20/58 |
| 2021/0009147 | A1 * | 1/2021 | Maag | G01S 13/931 |
| 2021/0331673 | A1 * | 10/2021 | Zhang | B60W 30/09 |
| 2022/0144254 | A1 * | 5/2022 | Weiss | B60W 50/0097 |
| 2022/0144262 | A1 * | 5/2022 | Weiss | B60W 10/18 |
| 2022/0144263 | A1 * | 5/2022 | Weiss | B60W 30/0953 |
| 2022/0144264 | A1 * | 5/2022 | Weiss | B60W 40/109 |
| 2022/0363246 | A1 * | 11/2022 | Lang | B60W 40/08 |

\* cited by examiner

METHOD AND APPARATUS FOR CONTROLLING A SAFETY DEVICE OF A VEHICLE, AND SAFETY SYSTEM FOR A VEHICLE

CROSS REFERENCE

The present application claims the benefit under 35 U.S.C. § 119 of German Patent Application No. DE 102020214033.2 filed on Nov. 9, 2020, which is expressly incorporated herein by reference in its entirety.

FIELD

The present invention relates to an apparatus and a method for controlling a safety device of a vehicle. A further subject of the present invention is a computer program.

BACKGROUND INFORMATION

Driver assistance systems that can perform automatic emergency braking of a vehicle as an intervention in the case of an acute risk of collision with one or several other traffic participants are, for example, conventional. In such an intervention a displacement of an impingement point, to be expected without the intervention, of another traffic participant on the vehicle into an undesired region of the vehicle can occur in some circumstances.

SUMMARY

The present invention provides a method, also an apparatus that uses that method, and a corresponding computer program, for controlling a safety device of a vehicle. The features disclosed herein make possible advantageous refinements of and improvements to the apparatus described herein.

In accordance with example embodiments of the present invention, in particular in the context of an imminent collision of a vehicle with a collision object, an impingement point and a possible displacement of the impingement point with consideration of an intervention of a safety device or of an assistance function of the vehicle can be determined, and can be used to control the safety device. For example, the impingement point and possible displacement of the impingement point can be predicted for consideration in the context of activation of an autonomous emergency braking (AEB) system for side impact scenarios or the like. In other words, a collision point of a collision object on the host vehicle can, in particular, be determined or predicted as a basis for an activation decision of a safety device, in particular an autonomous safety device. For this, for example, a detection of the expected collision point can be carried out and an ascertainment can be made as to whether and how that collision point will be displaced to a favorable or unfavorable position by a planned intervention of the safety device, in particular by adapting a velocity or trajectory of the host vehicle in the event of an autonomous braking or acceleration operation, or in the case of an autonomous evasive maneuver.

Advantageously, in accordance with embodiments of the present invention, in particular depending on a nature of the planned intervention or activated reaction pattern, for example a length and an intensity of an autonomous braking intervention or evasive maneuver, the collision can be avoided or the impingement point can be displaced along a contour of the host vehicle, for example, in the case of a reduction in the velocity of the host vehicle due to a time gain that results in a later arrival in a collision zone. In particular, an attenuation of accident consequences can be achieved by a reduction in the velocity of the host vehicle, in which context a collision point can be displaced, by the intervention of the safety device, for example, from a rear side region to a front side region or to a central front region of the host vehicle. In accordance with embodiments, a worsening of an accident sequence due to an intervention by the safety device can, in particular, also be avoided, by the fact that in the context of an expected displacement of the collision point into the region of the passenger compartment of the host vehicle, the planned intervention can be prevented even if a reduction in the velocity of the host vehicle thereby fails to occur. For example, in particular, a direct impact onto the passenger compartment of the vehicle, with possibly more-serious injuries to the occupants, can be reliably prevented. In particular, an advantageous modification of the collision region on the vehicle, and if applicable of the entire collision event, can be made possible by displacing the impingement point by suitable application of control to the safety device.

A method for controlling a safety device of a vehicle is provided in accordance with the present invention, the safety device being embodied to react to an imminent collision of the vehicle with a collision object by way of an intervention in a longitudinal and/or lateral guidance of the vehicle. In accordance with an example embodiment of the present invention, the method includes the following steps:

reading in, from an interface to at least one environment sensor of the vehicle, environment data regarding a position, a velocity and, additionally or alternatively, an acceleration of the collision object in an environment of the vehicle; from an interface to at least one trip data sensor of the vehicle, trip data regarding a position, a velocity and, additionally or alternatively, an acceleration of the vehicle; and from an interface to the safety device, intervention data regarding a planned intervention of the safety device;

ascertaining a first expected impingement point of the collision object on the vehicle using the environment data and the trip data, and a second expected impingement point of the collision object on the vehicle using the environment data, the trip data, and the intervention data;

executing an evaluation of a location of the first expected impingement point and of a location of the second expected impingement point relative to subregions referred to the vehicle, using reference data that define, for each subregion, an evaluation factor that depends on an effect of the location of an expected impingement point in the subregion on a safety status of at least one occupant of the vehicle; and generating, depending on a result of the evaluation, a control signal for output to an interface to the safety device, the control signal having at least one control parameter for controlling the safety device.

This example method can be implemented, for example, in software or hardware or in a mixed form of software and hardware, for example in a control device or an apparatus. The vehicle can be a motor vehicle, in particular a passenger car or the like. The safety device can be embodied to bring about an autonomous emergency braking operation and, additionally or alternatively, an autonomous evasive maneuver of the vehicle. The collision object can be an external vehicle or a stationary obstacle. The environment data can be data detected relative to the vehicle. The at least one environment sensor can encompass, for example, a camera, a radar device and, additionally or alternatively, a lidar sensor of the vehicle. The intervention data can represent information regarding a planned duration and/or a planned amplitude of an activation of a braking system, a steering system, a transmission and, additionally or alternatively, an engine of the vehicle. The first expected impingement point can represent an impingement point in the absence of the planned intervention. The second expected impingement point can represent an impingement point with consideration of the planned intervention. Each evaluation factor can be predefined on the basis of measurements, experiments and, additionally or alternatively, statistical methods. Each evaluation factor can represent an expected injury severity for occupants in the context of a location of an impingement point in the pertinent subregion. A subregion can encompass a sub-portion of the vehicle and, additionally or alternatively, a region, adjacent to a sub-portion of the vehicle, of an environment of the vehicle. The at least one control parameter can represent a duration and/or an amplitude of an activation of a braking system, a steering system, a transmission and, additionally or alternatively, an engine of the vehicle.

In accordance with an embodiment of the present invention, reference data that define, for at least one subregion in the region of a passenger compartment of the vehicle, a first evaluation factor that represents an effect having a first damage potential, and define, for at least one subregion outside a region of the passenger compartment, a second evaluation factor that represents an effect having a second damage potential, can be used in the executing step. The first damage potential can be greater than the second damage potential. A damage potential can be occupant-related and, additionally or alternatively, vehicle-structure-related. An embodiment of this kind offers the advantage that a decision regarding activation or deactivation of the intervention of the safety device can be made in simple, reliable, and exact fashion.

Reference data whose evaluation factors depend on a collision-related deformation of a sub-portion of the vehicle in at least one of the subregions can also be used in the executing step. The deformation can be defined as a vehicle deformation index (VDI, in particular VDI3). An embodiment of this kind offers the advantage of making possible a reliable statement as to which impingement point location is to be assumed to be less harmful for occupants.

In accordance with an example embodiment of the present invention, in the generating step, the control signal can furthermore be generated with at least one control parameter that brings about an enabling or a suppression of the planned intervention of the safety device. For example, an enabling of the planned intervention can be brought about if the location of the second expected impingement point is in a subregion whose evaluation factor is more favorable for safety than a further evaluation factor of a further subregion having the location of the first expected impingement point. For example, a suppression of the planned intervention can be brought about if the location of the first expected impingement point is in a subregion whose evaluation factor is more favorable for safety than a further evaluation factor of a further subregion having the location of the second expected impingement point. An advantageous displacement of the impingement point into a subregion that is less objectionable for safety can thereby be made possible by enabling or suppressing the planned intervention.

Additionally or alternatively, in the generating step the control signal can be generated with at least one control parameter that brings about a modification of the planned intervention of the safety device. A modified intervention of the safety device can be brought about in this context. The control signal can be generated using a result of an evaluation in which a location of a third expected impingement point that results in the context of the modified intervention is evaluated. An embodiment of this kind offers the advantage that the location of an expected impingement point can be optimized even when the first expected impingement point and the second expected impingement point happen to be unfavorably located.

In addition, in the generating step the control signal can be generated with at least one control parameter that brings about control of a duration and, additionally or alternatively, of an amplitude of the planned intervention. An embodiment of this kind offers the advantage that the safety device can be controlled in simple, reliable, and accurate fashion.

The approach presented here in accordance with the present invention furthermore provides an apparatus that is embodied to carry out, control, or implement, in corresponding devices, the steps of a variant of a method presented here. The object on which the present invention is based can also be quickly and efficiently achieved by this variant embodiment of the present invention in the form of an apparatus.

For this, the apparatus can have at least one computation unit for processing signals or data, at least one storage unit for storing signals or data, at least one interface to a sensor or an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like; the memory unit can be a flash memory, an EEPROM, or a magnetic storage unit. The communication interface can be embodied to read in or output data wirelessly and/or in wire-based fashion; a communication interface that can read in or output wire-based data can, for example, electrically or optically read in those data from a corresponding data transfer line or output them into a corresponding data transfer line.

An "apparatus" can be understood in the present case as an electrical device that processes sensor signals and, depending thereon, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be independent integrated circuits or to be made up at least in part of discrete components. With a software-based embodiment, the interfaces can be software modules that are present, for example, on a microcontroller alongside other software modules.

In an advantageous embodiment of the present invention, the apparatus controls a safety device of the vehicle for occupant protection. The apparatus can access for that purpose, for example, sensor signals or sensor data such as environment data, trip data, and intervention data. Control is applied using the control signal by way of the safety device via actuators that are associated with a braking system, a steering system, a transmission and, additionally or alternatively, an engine of the vehicle.

A safety system for a vehicle is also in accordance with the present invention. In accordance with an example embodiment, the safety system includes the following features:

an embodiment of the apparatus described above; and
the safety device, the safety device and the apparatus being signal-transferringly connected to one another.

In the context of the safety system, an embodiment of the apparatus described above can advantageously be used or utilized to control the safety device, in particular in the context of a recognized imminent collision.

Also advantageous is a computer program product or computer program having program code that can be stored on a machine-readable medium or storage medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the present invention are explained in further detail in the description below and are depicted in the figures.

DETAILED DESCRIPTION OF EXAMPLE EMBODIMENTS

Figure 1:
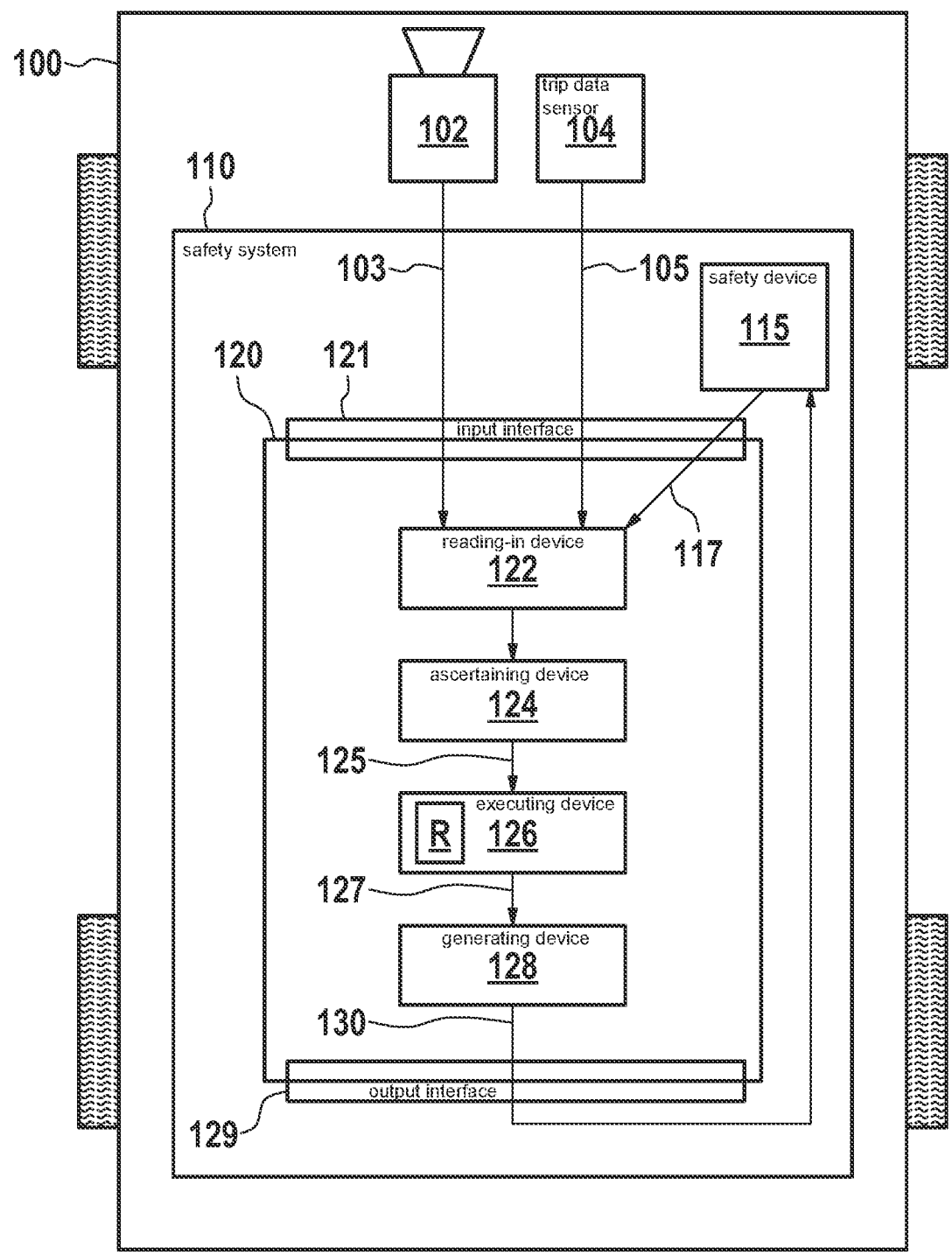
FIG. 1 schematically depicts a vehicle having a safety system, in accordance with an exemplifying embodiment of the present invention.

Before exemplifying embodiments of the present invention are described below in more detail, the background and principles of exemplifying embodiments will first be briefly discussed.

In active safety systems such as the safety system presented here, information from environment sensors, for instance radar or video, and an inherent motion, can be used to draw conclusions as to the criticality of a traffic situation. Because of field-of-view limitations of available systems for active safety, which are often equipped with front sensors having a limited azimuth detection angle, the focus is, for example, on accidents involving traffic moving in longitudinally or slowly from the side. In such accidents, an opposing traffic participant collides primarily with a front region of the host vehicle, regardless of whether the system does or does not activate. Systems that use additional sensors, or sensors having no relevant limitations on the detection angle, for instance corner radar sensors, can also react to traffic approaching rapidly from the side. Such application instances in the context of cross traffic are characterized in that collisions occur more frequently in the side region of the host vehicle.

A front cross traffic assist (FCTA) function can encompass, for example, the following reaction pattern:

Visual information that informs a driver of approaching cross traffic if the host vehicle is, for example, stationary at an intersection with poor visibility because of a viewing impediment.

Initial movement prevention, if a collision were to be expected due to initial movement and driving into the travel path of the cross traffic.

Activation of suspension stiffening, increased brake-system pressure to move the brake pads against the brake disc, so-called "prefill."

Optionally: braking assistance triggered by the driver which generates additional brake pressure if necessary as emergency braking assistance.

Activation of a driver warning in the case of a predicted imminent collision with cross traffic.

Autonomous emergency braking, partial or complete, in the case of a predicted imminent collision with cross traffic.

Optionally: activation of passive safety systems, for instance airbags, if a collision was unavoidable; activation of autonomous emergency steering (AES) to optimize a collision orientation.

Due to a lack of knowledge about mechanical structures of the collision object and an exact position and height of its passenger compartment, the emphasis is on optimization of a displacement of the impingement point of the host vehicle, in order to reduce or avoid injuries to the occupants of the host vehicle.

In the description below of useful exemplifying embodiments of the present invention, identical or similar reference characters are used for elements that are depicted in the various Figures and function similarly, repeated description of those elements being omitted.

FIG. 1 schematically depicts a vehicle 100 having a safety system 110, in accordance with an exemplifying embodiment. Vehicle 100 is a motor vehicle, for example a passenger car. All that is shown of vehicle 100 in the depiction of FIG. 1 by way of example is an environment sensor 102, a trip data sensor 104, and safety system 110. Safety system 110 is embodied to execute or bring about an autonomous emergency braking operation and/or an autonomous evasive maneuver of vehicle 100 in the event of an imminent collision of vehicle 100 with a collision object.

Environment sensor 102 is embodied to detect an environment of vehicle 100. More precisely, environment sensor 102 is embodied to detect a position, a velocity, and/or an acceleration of the collision object in the environment of vehicle 100. Environment sensor 102 is further embodied to furnish environment data 103 that represent the detected position, velocity, and/or acceleration of the collision object.

Trip data sensor 104 is embodied to detect trip data 105 of vehicle 100. More precisely, trip data sensor 104 is embodied to detect, as trip data 105, a position, a velocity, and/or an acceleration of vehicle 100. Trip data sensor 104 is furthermore embodied to furnish trip data 105.

Safety system 110 encompasses a safety device 115 and an apparatus 120 for controlling safety device 115. Safety device 115 and apparatus 120 are signal-transferringly connected to one another. Safety system 110, more precisely apparatus 120, is signal-transferringly connected to environment sensor 102 and to trip data sensor 104. Safety device 115 is embodied to react, by way of an intervention in a longitudinal and/or transverse guidance of vehicle 100, to an imminent collision of vehicle 100 with a collision object. Safety device 115 is also embodied to furnish intervention data 117 regarding a planned intervention of safety device 115. Apparatus 120 can also be referred to as a "control apparatus" or "control device."

Apparatus 120 encompasses an input interface 121, a reading-in device 122, an ascertaining device 124, an executing device 126, a generating device 128, and an output interface 129. Reading-in device 122 is embodied to read in environment data 103, trip data 105, and intervention data 117 from input interface 121. Apparatus 120 is signal-transferringly connected via input interface 121 to environment sensor 102, to trip data sensor 104, and to safety device 115. Reading-in device 122 is also embodied to forward the read-in data to ascertaining device 124. Ascertaining device 124 is embodied to ascertain, using environment data 103 and trip data 105, a first expected impingement point of the collision object on vehicle 100. Ascertaining device 124 is further embodied to ascertain, using environment data 103, trip data 105, and intervention data 117, a second expected impingement point of the collision object on vehicle 100. Ascertaining device 124 is also embodied to forward ascertained data 125, which represent the ascertained first expected impingement point and the ascertained second expected impingement point, to executing device 126.

Executing device 126 is embodied to receive ascertained data 125 from ascertaining device 124. Executing device 126 is embodied to execute, using reference data R, an evaluation of a location of the first expected impingement point and of a location of the second expected impingement point relative to subregions referred to vehicle 100. Reference data R define, for each subregion, an evaluation factor that depends on an effect of the location of an expected impingement point in the subregion on a safety status of at least one occupant of vehicle 100. Executing device 126 is also embodied to forward result data 127, which represent a result of the evaluation, to generating device 128. Generating device 128 is embodied to generate, depending on the result of the evaluation, a control signal 130 for output to output interface 129 to safety device 115. Control signal 130 encompasses at least one control parameter for controlling safety device 115. Apparatus 120 is embodied to output control signal 130 to output interface 129 to safety device 115.

In accordance with an exemplifying embodiment, executing device 126 is embodied to use reference data R, which define for at least one subregion in the region of a passenger compartment of vehicle 100 a first evaluation factor that represents an effect having a first damage potential, and define for at least one subregion outside a region of the passenger compartment a second evaluation factor that represents an effect having a second damage potential. The first damage potential is greater than the second damage potential. In particular, executing device 126 is embodied to use reference data R whose evaluation factors depend on a collision-related deformation of a sub-portion of vehicle 100 in at least one of the subregions.

In accordance with an exemplifying embodiment, generating device 128 is embodied to generate control signal 130 with at least one control parameter that brings about an enabling or a suppression of the planned intervention of safety device 115. Additionally or alternatively, generating device 128 is embodied to generate control signal 130 with at least one control parameter that brings about a modification of the planned intervention of safety device 115. In particular, generating device 128 is embodied to generate control signal 130 with at least one control parameter that brings about control of a duration and/or an amplitude of the planned intervention.

Figure 2:
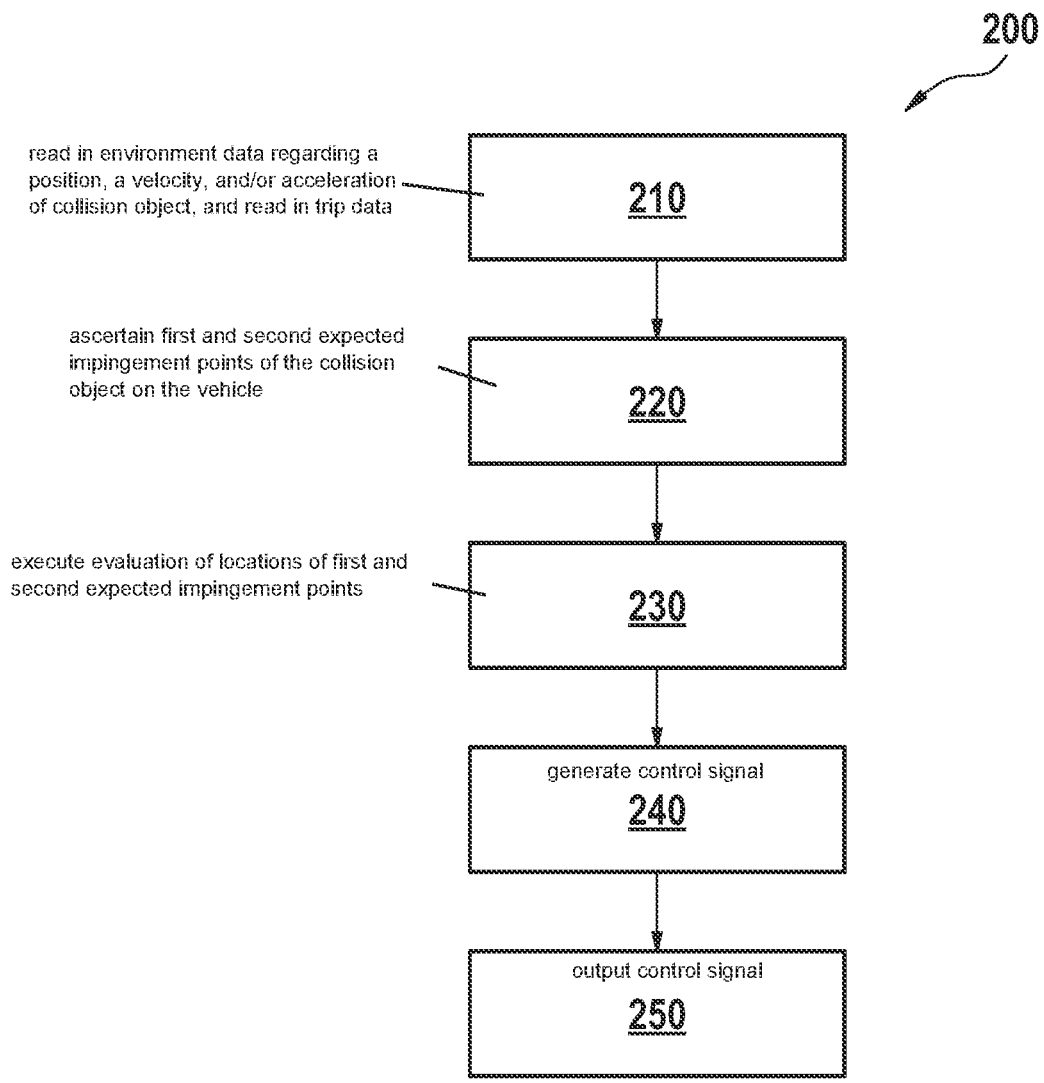
FIG. 2 is a flow chart for a control method, in accordance with an exemplifying embodiment of the present invention.

FIG. 2 is a flow chart of a control method 200, in accordance with an exemplifying embodiment. Control method 200 is executable in order to control a safety device of a vehicle. Control method 200 is executable in order to control the safety device of FIG. 1 or a similar safety device. Control method 200 is also executable using the apparatus of FIG. 1 or a similar apparatus. Control method 200 encompasses a reading-in step 210, an ascertaining step 220, an executing step 230, and a generating step 240. An outputting step 250 is additionally shown.

In reading-in step 210, environment data regarding a position, a velocity, and/or an acceleration of the collision object in an environment of the vehicle are read in from an interface to at least one environment sensor of the vehicle. In addition, in reading-in step 210 trip data regarding a position, a velocity, and/or an acceleration of the vehicle are read in from an interface to at least one trip data sensor of the vehicle. In reading-in step 210, intervention data regarding a planned intervention of the safety device are also read in from an interface to the safety device.

In ascertaining step 220, a first expected impingement point of the collision object on the vehicle is then ascertained using the environment data and the trip data. A second expected impingement point of the collision object on the vehicle is also ascertained in ascertaining step 220 using the environment data, the trip data, and the intervention data. An evaluation of a location of the first expected impingement point and of a location of the second expected impingement point, relative to subregions referred to the vehicle, is then in turn executed in executing step 230 using reference data. The reference data define, for each subregion, an evaluation factor that depends on an effect of the location of an expected impingement point in the subregion on a safety status of at least one occupant of the vehicle. In generating step 240, a control signal for output to an interface to the safety device is then generated depending on a result of the evaluation executed in executing step 230. The control signal encompasses at least one control parameter for controlling the safety device.

In accordance with an exemplifying embodiment, control method 200 also encompasses outputting step 250. In outputting step 250, the control signal generated in generating step 240 is outputted to the interface to the safety device.

Figure 3:
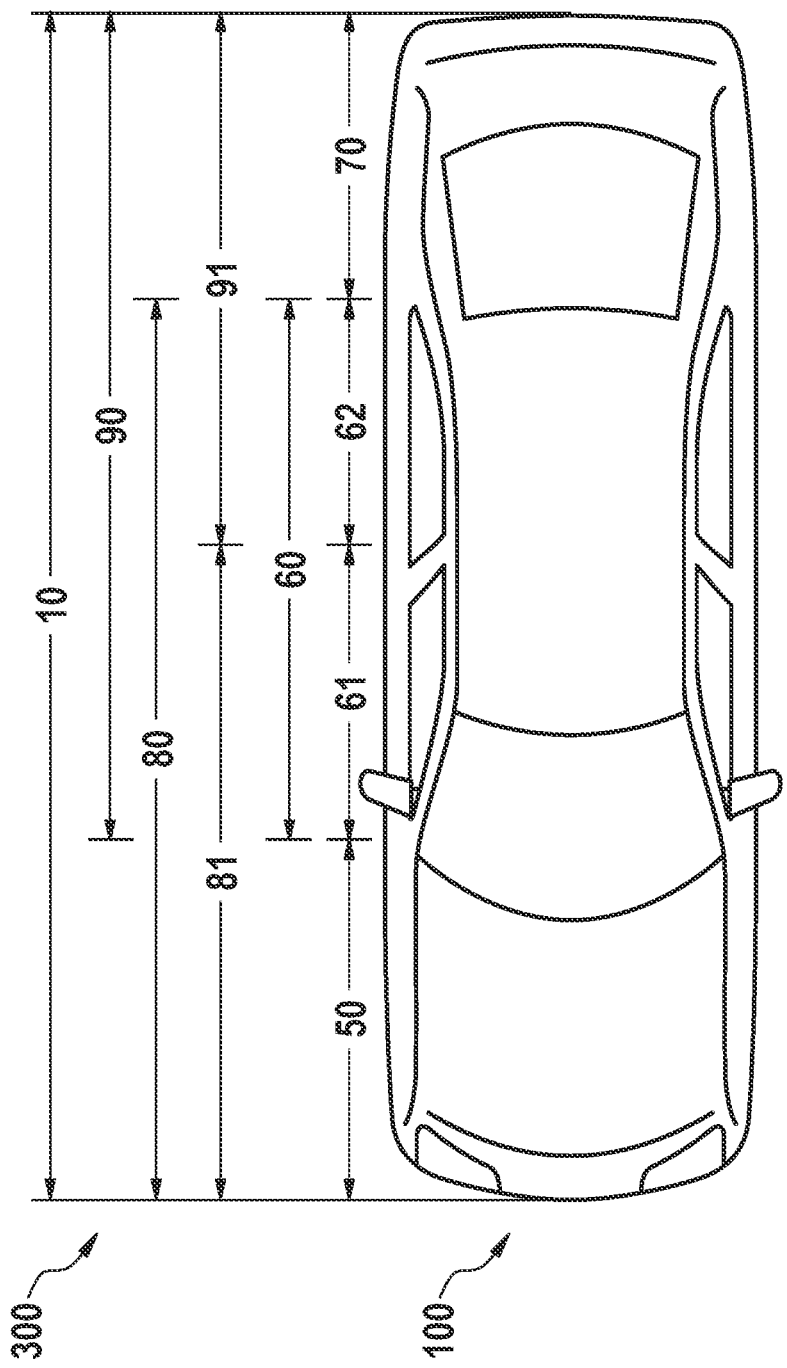
FIG. 3 schematically depicts subregions of a vehicle, in accordance with an exemplifying embodiment of the present invention.

FIG. 3 schematically depicts subregions 300 of a vehicle 100, in accordance with an exemplifying embodiment. Subregions 300 are the subregions mentioned in FIG. 1 and/or FIG. 2, or similar subregions. FIG. 3 depicts, merely for illustration, vehicle 100 that corresponds to or resembles the vehicle of FIG. 1. In accordance with the exemplifying embodiment depicted here, subregions 300 are defined as vehicle deformation index (VDI) regions or similar regions. Subregions 300 are used to execute the evaluation of the location of the impingement points, for example of original and optimum collision points or impingement points, in order to avoid or minimize injuries to the occupant or occupants of vehicle 100. A plurality of subregions 300 is shown, each of subregions 300 having an evaluation factor associated with it. In accordance with the exemplifying embodiment depicted here, subregions 300 are defined as side impact regions. For example, subregions in the region of a passenger compartment of vehicle 100 are subregions 60, 61, and 62, and subregions outside the region of the passenger compartment of vehicle 100 are subregions 50 and 70.

The objective is to check the probability as to which VDI region of vehicle 100 will be impinged upon by the collision object or accident opponent in the event of an active, inactive, or partly modified system activation or an active, inactive, or partly modified intervention of the safety system, and to derive a decision with regard to a system activation or control of the safety device. The safest subregion possibly related to occupants is 50 (VDI3=50); the least safe subregions possibly related to occupants are 60, 61, and 62 (VDI3=60, 61, and 62).

Figure 4:
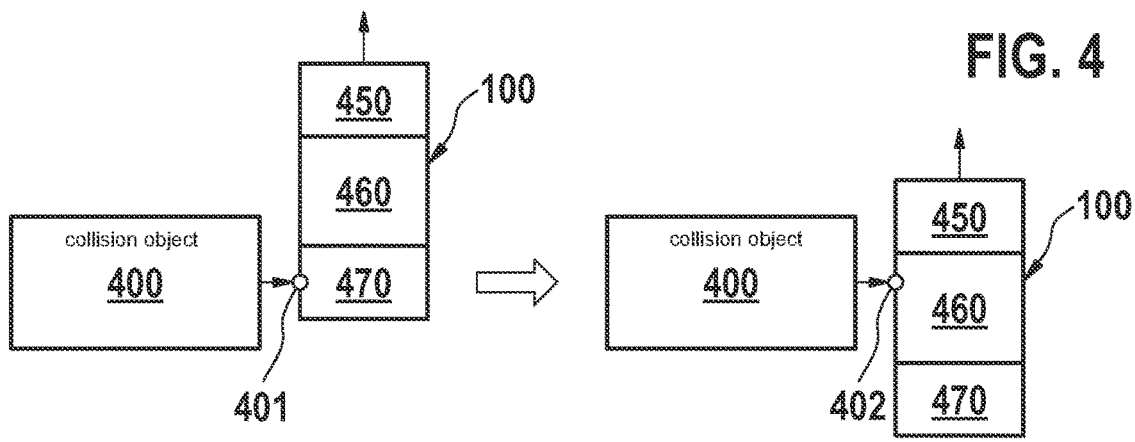
FIG. 4 schematically depicts impingement points of a collision object on a vehicle, in accordance with an exemplifying embodiment of the present invention.
Figure 5:
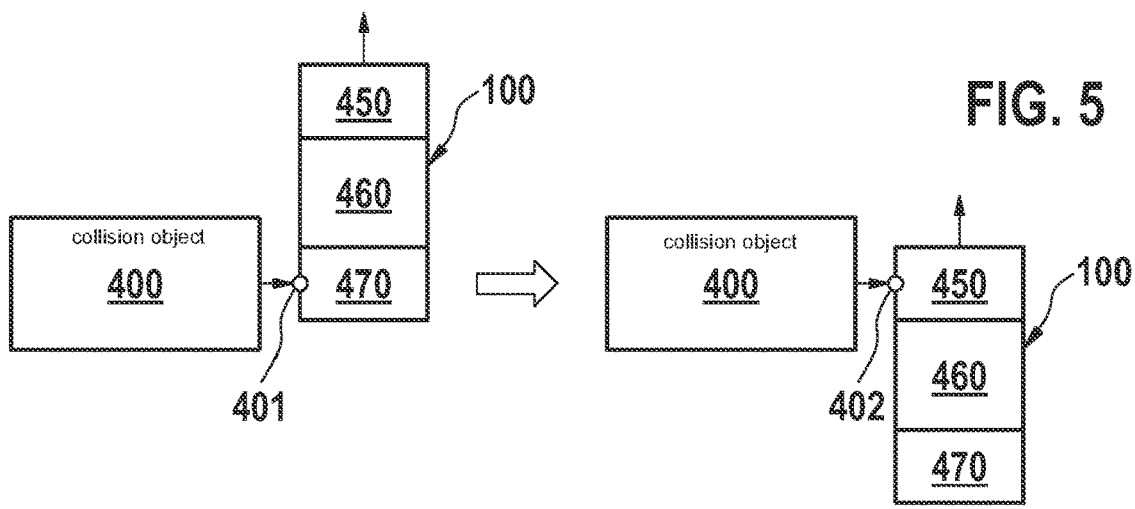
FIG. 5 schematically depicts impingement points of a collision object on a vehicle, in accordance with an exemplifying embodiment of the present invention.
Figure 6:
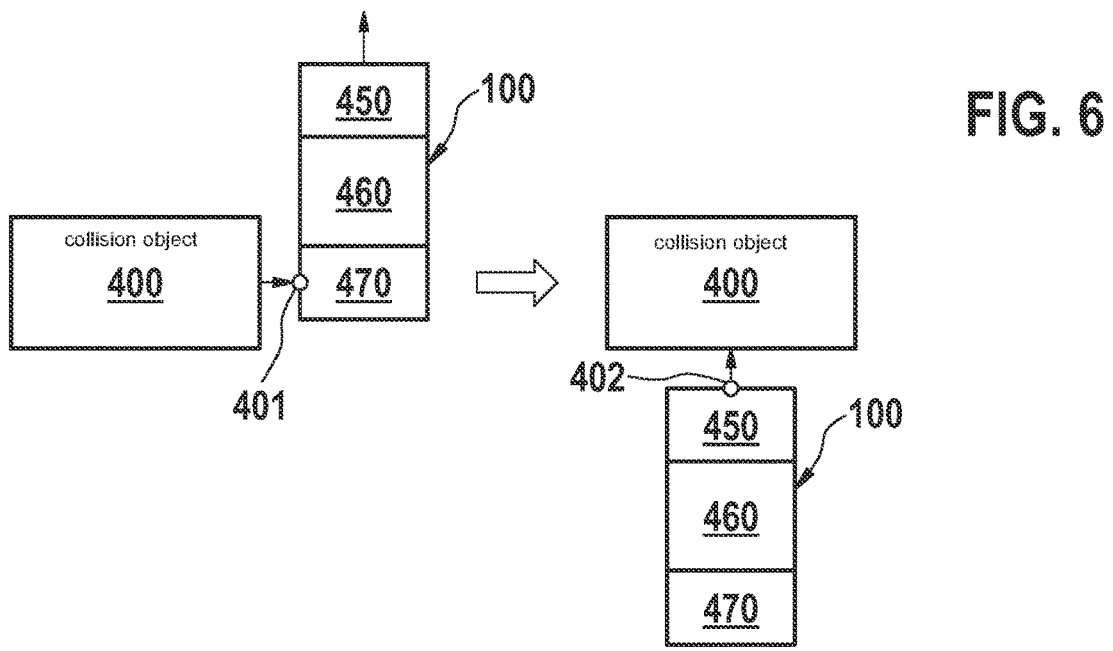
FIG. 6 schematically depicts impingement points of a collision object on a vehicle, in accordance with an exemplifying embodiment of the present invention.

FIG. 4, FIG. 5, and FIG. 6 each schematically depict impingement points 401, 402 of a collision object 400 on a vehicle 100, in accordance with an exemplifying embodiment in the context of an imminent collision thereof. Vehicle 100 corresponds to or resembles the vehicle of FIG. 1. FIG. 4, FIG. 5, and FIG. 6 each show first expected impingement point 401 between collision object 400 and vehicle 100 without consideration of the planned intervention of the safety device, and second expected impingement point 402 between collision object 400 and vehicle 100 with consideration of the planned intervention of the safety device. A first subregion 460 in the region of a passenger compartment of vehicle 100 and, by way of example, two further subregions 450 and 470 outside the region of the passenger compartment of vehicle 100, are shown for vehicle 100 in each case. A travel direction of vehicle 100, and a travel direction of collision object 400, are also respectively depicted.

In other words, what is explained with reference to FIG. 4, FIG. 5, and FIG. 6 is the manner in which first expected impingement point 401 can change to second expected impingement point 402 as a result of an activation or adaptation of the autonomous safety system of vehicle 100. FIG. 4, FIG. 5, and FIG. 6 show examples of different displacements of first expected impingement point 401 along the contour of vehicle 100 as a result of an activation of the safety device, in particular of a cross traffic assistant, for instance with autonomous braking. The respective impingement points 401 and 402 on vehicle 100 are shown. The manner in which first expected impingement point 401 is displaced, depending on a length and intensity of the intervention of the safety device, for example a braking operation, and on the time gain resulting therefrom, from the original position without system activation to second expected impingement point 402 in other subregions of vehicle 100, is illustrated.

FIG. 4 shows an example of an unfavorable displacement of first expected impingement point 401 as a result of an emergency braking operation of vehicle 100. First expected impingement point 401 is located in further subregion 470, in this case the rear of vehicle 100. Second expected impingement point 402 is located in first subregion 460, i.e. in the region of the passenger compartment of vehicle 100. An elevated risk of occupant injury in host vehicle 100, due to a direct impact in the region of the passenger compartment, therefore results. This unfavorable displacement of the impingement point can be prevented if the intervention of the safety device (or, here, the emergency braking operation) is suppressed, such that the expected impingement point remains in the non-critical or safer subregion (see FIG. 3, VDI 70) of host vehicle 100; or if the braking characteristic is adapted, in particular in terms of the length and intensity of the braking operation, such that the expected impingement point is displaced into a more favorable or safer subregion (see FIG. 5 and FIG. 6).

FIG. 5 shows an example of a more favorable displacement of first expected impingement point 401 as a result of an intervention of the safety device in the form of an autonomous braking operation of host vehicle 100. First expected impingement point 401 is located in further subregion 470, in this case at the rear of vehicle 100. Second expected impingement point 402 is located in further subregion 450, in this case in the front side region of vehicle 100. The result is a decreased risk of occupant injury in host vehicle 100 due to an impact in the front side region of host vehicle 100. The safety device can thus be controlled to execute the planned intervention.

FIG. 6 shows an example of an optimal displacement of first expected impingement point 401 as a result of an autonomous braking operation of host vehicle 100. First expected impingement point 401 is located in further subregion 470, in this case at the rear of vehicle 100. Second expected impingement point 450 is located in further subregion 450, in this case in the central front region of vehicle 100. The safety device can thus be controlled so as to execute the planned intervention. Optionally, the safety device can be controlled so as to modify the planned intervention. The result is a minimized risk of occupant injury in host vehicle 100 due to an impact in the central front region of host vehicle 100, in particular because of optimal utilization of a crumple zone of host vehicle 100.

Figure 7:
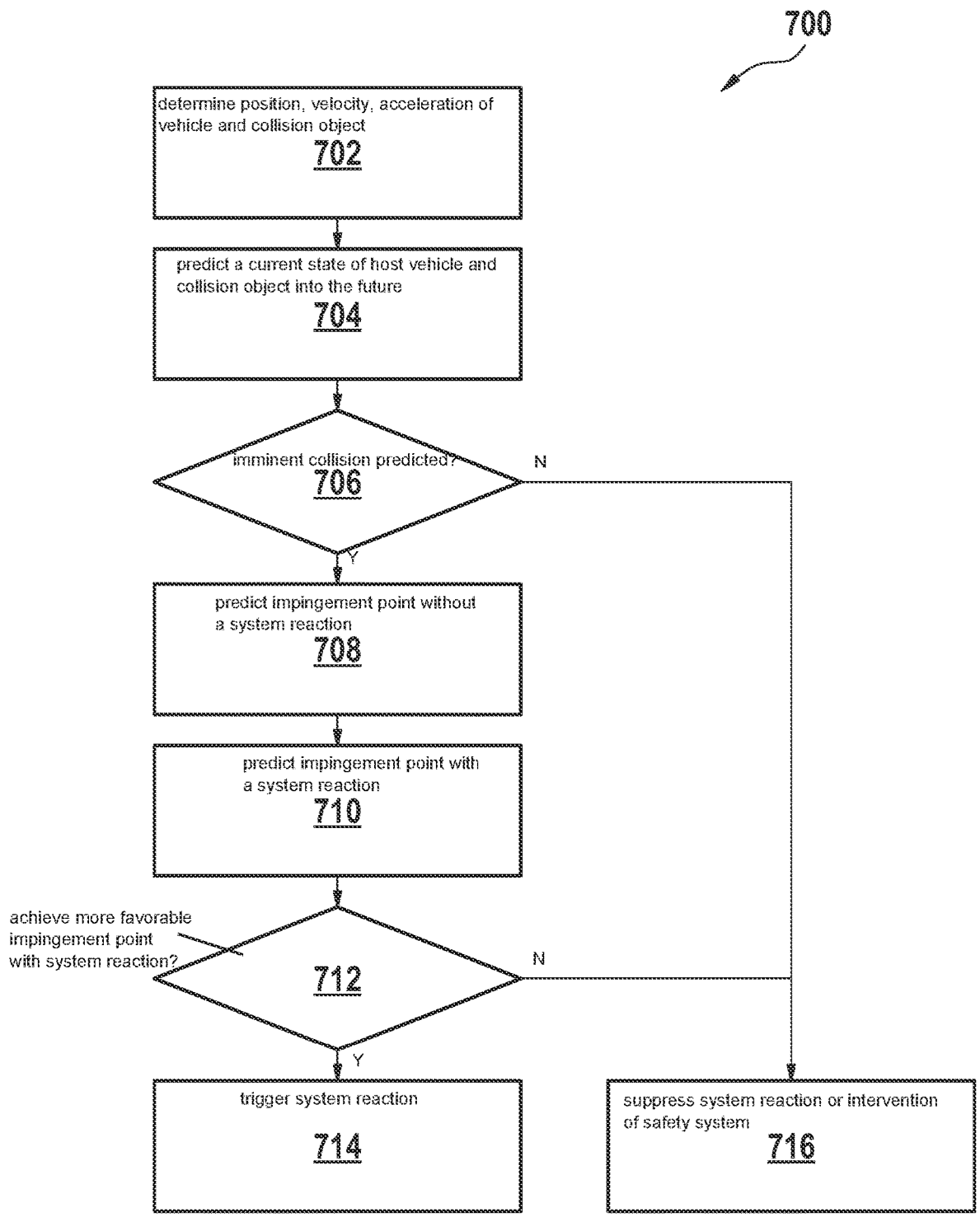
FIG. 7 is a flow chart of a control process, in accordance with an exemplifying embodiment of the present invention.

FIG. 7 is a flow chart of a control process 700, in accordance with an exemplifying embodiment. Control process 700 is executable in conjunction with the apparatus of FIG. 1 or a similar apparatus, and/or with the method of FIG. 2 or a similar method.

In a block 702, a position, a velocity, and an acceleration of the vehicle or host vehicle, and of a potential collision object, are determined. In a block 704, a current state of the host vehicle and of the collision object is then predicted into the future. In a decision block 706, a decision is then in turn made as to whether or not an imminent collision has been predicted. If it has been determined in decision block 706 that an imminent collision has not been predicted, control process 700 then goes to a block 716, in which the system reaction or the intervention of the safety device is suppressed or not activated. If it has been determined in decision block 706 that an imminent collision has been predicted, control process 700 then goes to a block 708 in which the impingement point or collision point without a system reaction is predicted, and to a block 710 in which the impingement point or collision point with a system reaction is estimated. In a decision block 712, a decision is then made as to whether a more favorable impingement point or collision point is achieved by way of the system reaction. If it is determined in decision block 712 that a more favorable impingement point or collision point is achieved by way of the system reaction, the system reaction is then triggered in a block 714. If it is determined in decision block 712 that a favorable impingement point or collision point is not achieved by way of the system reaction, then in block 716 the system reaction or the intervention of the safety system is suppressed or not triggered.

In other words, the autonomous safety system, which corresponds to or resembles the safety system of FIG. 1, is embodied to determine, in the context of an execution of control process 700, the relative positions and relative velocities of the host vehicle and of the collision object using environment sensors and trip data sensors or vehicle information sensors. This information is predicted into the future and checked in terms of the occurrence of an imminent collision. In the case of a collision, an estimate is made of the predicted collision point between the collision object and the host vehicle with consideration of the current trajectories without system activation, and an estimate is made of the collision point in the event of a system activation. In the ideal case, no collision occurs or the collision point is displaced into the central front region of the host vehicle. An assessment is also made as to whether the displacement of the collision point is favorable; and a decision is made as to whether and how the safety device is to be triggered, in the sense of optimizing the nature and intensity of the system activation.

In accordance with an exemplifying embodiment, an environment sensor having the capability of detecting or estimating a position of the passenger compartment of the collision object, for instance a video sensor, can be included in order to enhance the advantages of the above-described control process 700. This additional information makes possible a consideration of an optimal or even more suitable impact point for both accident participants.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for controlling a safety device of a vehicle, the safety device being configured to react to an imminent collision of the vehicle with a collision object by way of an intervention in a longitudinal and/or lateral guidance of the vehicle, the method comprising the following steps:
    reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
    ascertaining: (i) a first expected impingement point of the collision object on the vehicle using the environment data and the trip data, and (ii) a second expected impingement point of the collision object on the vehicle using the environment data, the trip data, and the intervention data;
    executing an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and
    generating, depending on a result of the evaluation, a control signal for output to an interface to the safety device, the control signal having at least one control parameter for controlling the safety device.

2. The method as recited in claim 1, wherein the reference data include first reference data that define, for at least one of the subregions in a region of a passenger compartment of the vehicle, a first evaluation factor that represents an effect having a first damage potential, and define, for at least one of the subregions outside the region of the passenger compartment, a second evaluation factor that represents an effect having a second damage potential, the first reference data being used in the executing step, the first damage potential being greater than the second damage potential.

3. The method as recited in claim 1, wherein the reference data include first reference data whose evaluation factors depend on a collision-related deformation of a sub-portion of the vehicle in at least one of the subregions, the first reference data being used in the executing step.

4. The method as recited in claim 1, wherein in the generating step, the control signal is generated with at least one control parameter that brings about an enabling or a suppression of the planned intervention of the safety device.

5. The method as recited in claim 1, wherein in the generating step, the control signal is generated with at least one control parameter that brings about a modification of the planned intervention of the safety device.

6. The method as recited in claim 1, wherein in the generating step, the control signal is generated with at least one control parameter that brings about control of a duration and/or of an amplitude of the planned intervention of the safety device.

7. An apparatus configured to control a safety device of a vehicle, the safety device being configured to react to an imminent collision of the vehicle with a collision object by way of an intervention in a longitudinal and/or lateral guidance of the vehicle, the apparatus configured to:
    read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
    ascertain: (i) a first expected impingement point of the collision object on the vehicle using the environment data and the trip data, and (ii) a second expected impingement point of the collision object on the vehicle using the environment data, the trip data, and the intervention data;
    execute an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and
    generate, depending on a result of the evaluation, a control signal for output to an interface to the safety device, the control signal having at least one control parameter for controlling the safety device.

8. A safety system for a vehicle, the safety system comprising:
    a safety device of the vehicle, wherein the safety device is configured to react to an imminent collision of the vehicle with a collision object by way of an intervention in a longitudinal and/or lateral guidance of the vehicle; and
    an apparatus that is connected to the safety device such that a control signal is transferrable from the apparatus to the safety device, wherein the apparatus is configured to:
        read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (ii) from an interface to the safety device, intervention data regarding a planned intervention of the safety device;

ascertain: (i) a first expected impingement point of the collision object on the vehicle using the environment data and the trip data, and (ii) a second expected impingement point of the collision object on the vehicle using the environment data, the trip data, and the intervention data;

execute an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle, and generate, depending on a result of the evaluation, the control signal for output to an interface to the safety device, the control signal having at least one control parameter for controlling the safety device.

9. A non-transitory machine-readable storage medium on which is stored a computer program for controlling a safety device of a vehicle, the safety device being configured to react to an imminent collision of the vehicle with a collision object by way of an intervention in a longitudinal and/or lateral guidance of the vehicle, the computer program, when executed by a computer, causing the computer to perform the following steps:

reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;

ascertaining: (i) a first expected impingement point of the collision object on the vehicle using the environment data and the trip data, and (ii) a second expected impingement point of the collision object on the vehicle using the environment data, the trip data, and the intervention data;

executing an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and generating, depending on a result of the evaluation, a control signal for output to an interface to the safety device, the control signal having at least one control parameter for controlling the safety device.

* * * * *